July 20, 1971 F. J. JACOB 3,594,461
METHOD AND APPARATUS FOR CONTINUOUSLY MOLDING
SHEETS FROM EXPANDABLE POLYMERIC MATERIALS
Filed Jan. 21, 1969 3 Sheets-Sheet 1

INVENTOR.
FRANCIS J. JACOB
BY C. E. Parker

INVENTOR.
FRANCIS J. JACOB
BY C. E. Parker

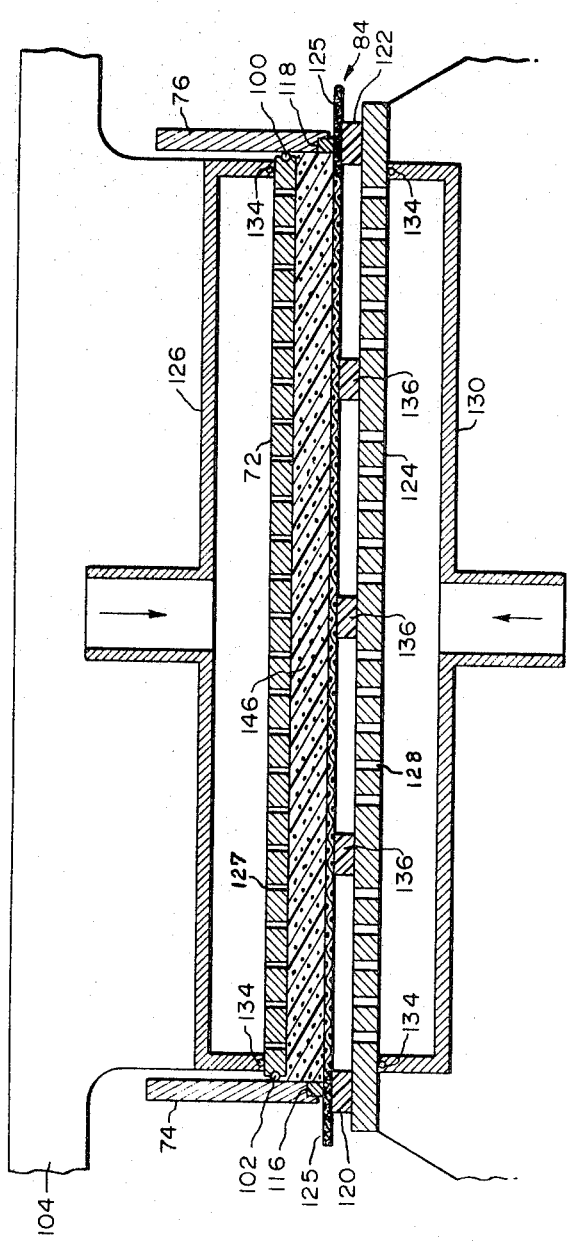
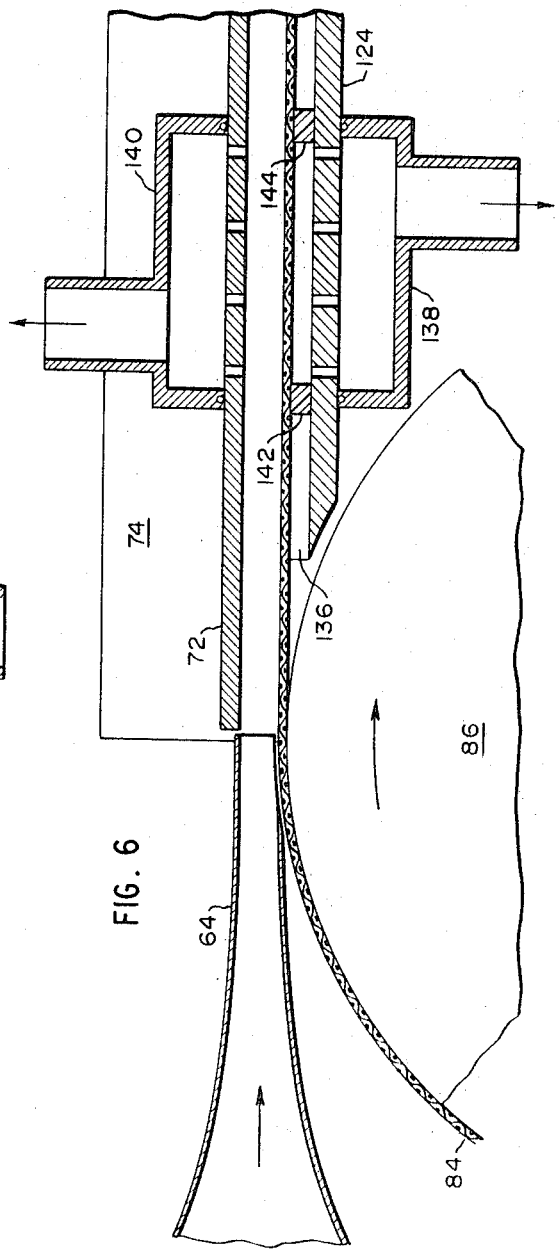
FIG. 5
FIG. 6
INVENTOR.
FRANCIS J. JACOB
BY C. E. Parker

United States Patent Office 3,594,461
Patented July 20, 1971

3,594,461
**METHOD AND APPARATUS FOR CONTINU-
OUSLY MOLDING SHEETS FROM EXPAND-
ABLE POLYMERIC MATERIALS**
Francis J. Jacob, New Castle, Pa., assignor to
W. R. Grace & Co., Cambridge, Mass.
Filed Jan. 21, 1969, Ser. No. 792,312
Int. Cl. B29c 5/00, 5/10; B29d 7/14
U.S. Cl. 264—51                                    16 Claims

ABSTRACT OF THE DISCLOSURE

An apparatus and method for continuous molding of heat expandable thermoplastic granules into an agglutinated body including an open-ended molding channel which has only a single moving surface for conveying the agglutinated continuous body formed after the application of heat to the granules. The single moving surface is preferably a woven wire belt or equivalent which is foraminous over its entire width. The apparatus also includes a means for adjusting the height of the molding channel while the machine is in operation. Means are provided for evacuating feed air or heating fluid from the molding channel between feeding and heating of the granules.

BACKGROUND OF THE INVENTION

This invention relates to the continuous formation of molded bodies of thermoplastic materials wherein granules or beads of a polymeric material containing a heat expanding or blowing agent are fed into an open-ended molding channel, subjected to heat, and discharged as an agglutinated coherent body having substantially the size and shape of the molding channel. In particular, the invention relates to the continuous production of sheets or billets of foamed agglutinated polystyrene from beads of polystyrene which have been pre-expanded. As an example of such beads, reference is made to "Dylite" expandable polystyrene beads, a product and trademark of the Koppers Company, Inc., which contains 5 to 8 percent by weight of a volatile, saturated paraffinic hydrocarbon blowing agent. By distinguishing sheets and billets it is meant to describe in the former case relatively thin slabs up to about 1–2 inches thick and the latter case slabs on the order of about 6–18 inches thick, the slabs being about 24–36 inches wide. This definition is meant to emphasize certain improvements possible with the present invention and not to limit it to use for any particular range.

Prior art apparatus for expanding polystyrene beads to produce continuous slabs of foamed product has generally included a molding space or channel provided between a plurality of moving surfaces, generally endless stainless steel conveyor belts. Such apparatus has generally also contained suitable means for supplying the expandable material to the channel; means for heating the expandable material within the channel to cause it to expand which normally consists of the introduction of steam into the molding channel; and suitable means for removing the expanded slab from the molding channel. Most prior art devices have also included cooling means for reducing the temperature of the expanded product in the channel when the desired amount of expansion is achieved.

In this respect, reference is made to U.S. Pat. Nos. 3,005,500 and 3,312,760 to E. Berner in which is described a plurality of perforated stainless steel belts driven between drums to form a molding channel and to transport the slab to a discharge opening at the end of the apparatus.

The advent of continuous molding of foamed polystyrene appeared to be a signal advance and in fact has achieved a substantial increase in efficiency over the older process of batch molding. Yet the apparatus and methods heretofore available have not made a reality of the advancement envisioned by the industry. This is so because such apparatus and methods have certain deficiencies which, in terms of economy, product quality control and versatility have depressed and discouraged widespread adoption of the process as an improvement over batch molding.

Two critical qualities requisite in the end product have been largely responsible for restraint in industry acceptance of continuous molding and for the low economy of operation. The first requisite is that the slab be uniformly foamed throughout; that is, that it have a uniform density and strength. In this regard, for most purposes it is desired that the beads expand to completely fill the molding channel, eliminating voids or air spaces between beads; and in addition, that the beads be completely agglutinated or welded. This can be accomplished if all the beads at a given cross-sectional location in the molding channel are uniformly subjected to the heating fluid (normally steam) and brought rapidly to their final foamed, agglutinated condition. In essence, the problem is that steam introduced through perforations in the belts forming the molding channel does not reach the center of the channel. One reason for this is that the beads near the areas of introduction of steam tend to block flow of steam to the interior. Another reason is that apparatus having a plurality of moving surfaces have a space at the edges of the belts at which the corners of the slab are formed. This space permits steam leakage, is wasteful of steam and also provides an alternate route for flow of the steam. Attempts to overcome this problem have included simply providing a longer exposure to the steam. This is not only undesirable but as can be seen from the foregoing, is of limited effect.

The second requisite is that the slab have the desired surface shape usually, rectangular. In this respect the surfaces must be flat and parallel and the corners must be sharp. In some cases, it is desired that the surfaces have a particular smoothness, however, requirements for smooth surfaces on continuously formed slabs are an exception. As the beads expand upon heating, the expansion is resisted by the molding channel which will define the ultimate form and should provide the resistance necessary to force the beads to fill voids and weld together. The same spaces at the edges of the moving surfaces which permit steam to escape permits unrestrained expansion of the beads. As a result, beads near the corners of the slab expand to a larger size and are only loosely held together with air spaces between them. The resulting slab does not have square corners and cannot be used as a final product without trimming. The effect is especially aggravated in thin slabs where the entire edge may be distorted and weak.

It is apparent that a variety of widths and thicknesses in the slab are desirable in order to meet market demands. Prior art machines of this type can be initially set for given dimensions. Variations in those dimensions require shut down and considerable effort in adjusting the moving surfaces with the result that a given machine is normally not so adjusted as long as the product is still desired. Slabs of differing dimensions require separate machines.

As mentioned, stainless steel belts have been used as the moving surfaces. These belts are usually perforated for the admission of steam into the molding channel. At the outset, stainless steel belts represent a severe expense. In addition, they must be replaced frequently for the reason that the perforation, heat and constant flexing precipitate fatigue failure in the belts. Due to the stress concentrations built up by perforations in such belts, they may not be perforated near their edges which results in non-uniform steam entry into the channel.

Since a smooth continuous surface is considered desirable in stainless steel belts, they must either be installed in one piece which requires almost complete disassembly of the machine; or they must be cut and welded on the machine in a very precise and costly manner.

The fact that a plurality of such belts has been required in the past has burdened the industry with a multiplicity of moving parts, the replacement or adjustment of which has required often lengthy shutdown of the continuous operation. Thus the use of a pulurality of stainless steel belts has been a severe empediment to efficiency.

Further, stainless steel belts tend to bow along their width when stretched tightly between drums. Thus the molding channel and the resulting polystyrene slab product will have non-flat surfaces. Such a product is not saleable.

SUMMARY OF THE INVENTION

The invention comprises a linear open-ended molding channel having only one moving surface for the continuous formation of sheets from heat expandable thermoplastic granules which are fed into the inlet opening. In a preferred embodiment the moving surface is a woven wire belt. Means are also included to vary the height of the channel by raising or lowering a non-moving upper surface. Further means are provided for evacuating steam from the molding channel upstream of the molding area. Means are also provided for evacuating air from the molding channel when air feeding of the beads is utilized.

BRIEF DESCRIPTION OF THE DRAWINGS

FIG. 5 shows a section view through the line 5—5 of the embodiment of FIG. 3;

FIG. 6 shows a section view through the line 6—6 of FIG. 4.

RESCRIPTION OF THE PREFERRED EMBODIMENT

Figure 1:
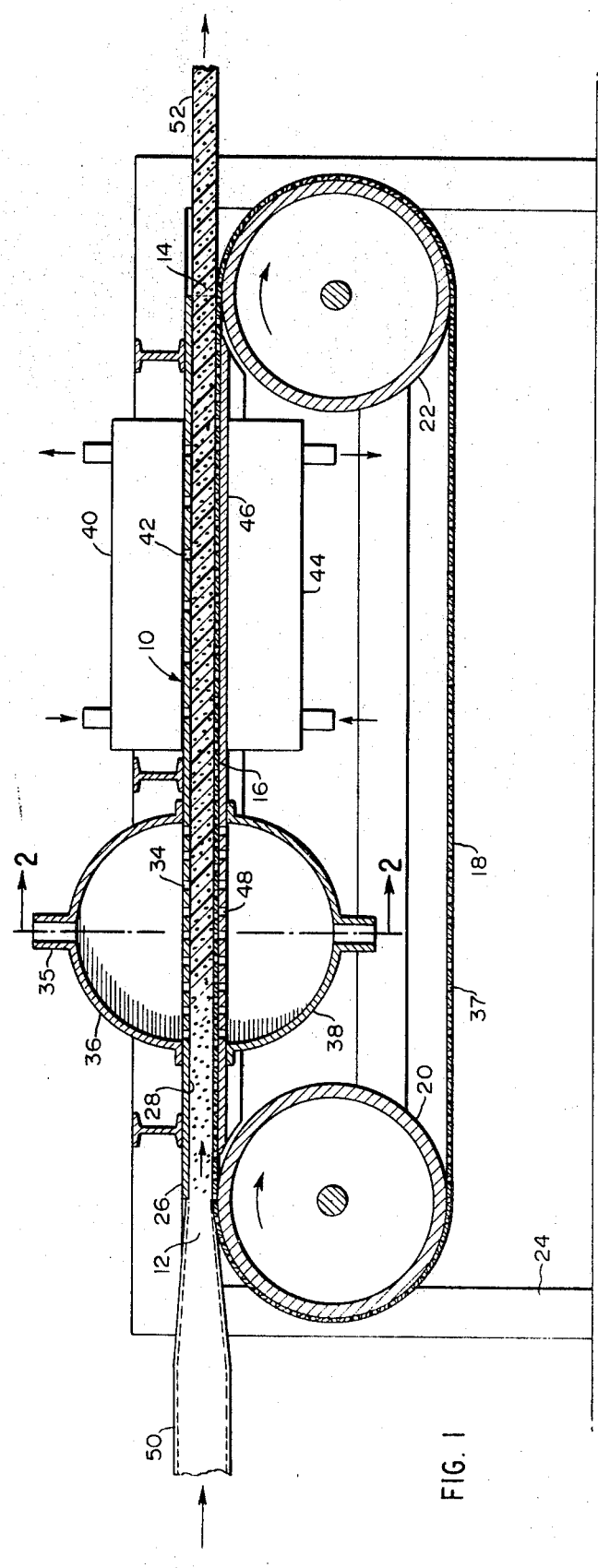
FIG. 1 shows a sectional side elevation view of a preferred embodiment illustrating the basic concept of the apparatus.
Figure 2:
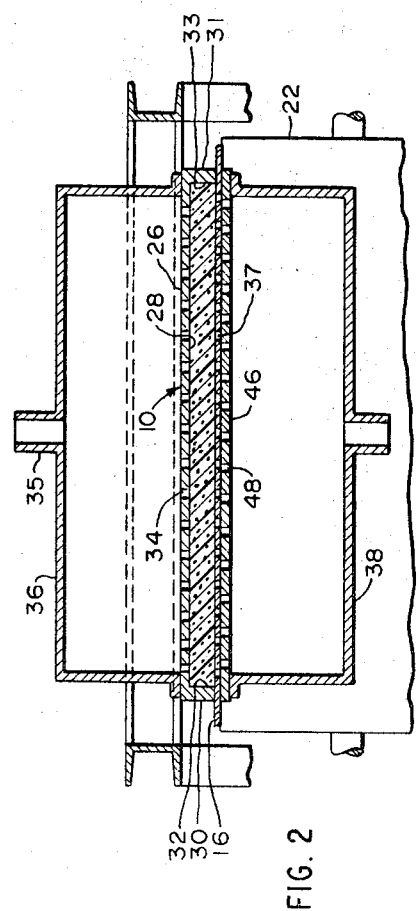
FIG. 2 shows a section view through the line 2—2 of a preferred embodiment of the apparatus of FIG. 1.

FIGS. 1 and 2 illustrate one embodiment of the broad concept of the invention comprising a molding channel having only one movable surface. The molding apparatus comprises generally a linear open-ended molding channel 10 having an inlet end 12 and a discharge end 14. A lower molding surface of the molding channel 10 is defined by the upper run 16 of a continuous belt 18 which is supported by drums 20 and 22. One of the drums is driven in a known manner to move the belt 18 from the inlet end 12 to the discharge end 14 of the molding channel 10. It is desirable that one of the drums preferably the drum which is not driven, be mounted for movement toward and away from the other drum in order to adjust tension on the belt 18. The drums 20 and 22 are rotatably mounted on a frame 24. As will be appreciated from the following there is no necessity to provide for vertical movement of the drums 20 and 22 upon the frame 24 in order to adjust the height of the molding channel 10.

The molding channel 12 is further defined by a rigid upper plate 26 which is spaced above the upper run 16 presenting an opposing molding surface 28. The upper plate 26 is attached to the frame 24 preferably so that it may be moved vertically toward and away from the upper run 16 whereby the height of the molding channel 20 may be varied. Normally, the upper run 16 and the upper plate 26 are maintained parallel to present a molding channel of constant, although adjustable, height. It is also possible, however, to adjust the upper plate 26 to a non-parallel orientation to present a tapered molding channel which is higher at one end than at the other. The molding channel is completed by rigid sides 30 and 31 which present opposite spaced-apart surfaces 32 and 33 respectively. The sides 30 and 31 extend downward from the upper plate 26 to the upper run 16 to form a substantially complete enclosure. Means may also be provided to vary the height of the sides 30 and 31 in accordance with adjustment of the height of the upper plate 26 or to replace them with sides of appropriate height.

At least one of the surfaces defining the channel is foraminous in order to introduce a heating gas into the molding channel 10. As embodied in FIG. 1, the upper plate 26 is perforated at 34. The heating gas, normally steam, is fed from a source not shown through an opening 35 into a steam chamber 36 which is placed over the perforations 34. The steam flows from the steam chamber 36 through the perforations 34 into the molding channel 10. It is also possible that steam be introduced into the molding channel 10 through perforations 37 in the belt 18 from a lower steam chest 38 located below the upper run 16 of the belt. It is evident that any single or combination of the surfaces of the molding channel 10 may be made foraminous for the introduction of steam. Means may also be provided between the steam chamber 36 and the discharge end 14 to cool the agglutinated coherent mass dormed in the channel. This may be done by providing means adjacent to the foraminous surface for introducing a cooling medium through the surface, downstream of the steam chamber. As embodied in FIG. 1, a cooling chamber 40 is placed over perforations 42 in the upper plate 26 into which chamber a cooling medium may be fed. If the cooling medium is desired to be a liquid, it is preferable to omit the perforations 42 and cool the channel by conduction through the upper plate 26. Although it may be convenient that the cooling medium be introduced through the same surface or surfaces as the heating gas, this is not essential, and it may be introduced through any of the surfaces regardless of where the heating gas is introduced. However, the cooling medium must always be introduced downstream of the heated area in order not to counteract the effect of the heating gas. A lower cooling box 44 is also shown. The lower steam chest 38 and the lower cooling box 44 are positioned on a support table 46 which is fixed to the frame 24. The support table 46 is perforated as at 48.

In operation pre-expanded beads of polystyrene containing a heat expanding agent are fed into the inlet end 12 by a suitable means, several of which are known in the art. For purposes of this description it is sufficient to illustrate a conduit 50 through which the beads are fed. The beads are carried by the upper run 16 down the molding channel 10 to the heating area adjacent the steam chambers 36 and 38 where they are subjected to steam which causes them to soften and the heat expanding agent to expand them into a coherent agglutinated slab 52 taking the shape of the molding channel 10. The slab 52 then moves downstream and is discharged at the discharge end 14. Normally the slab is allowed to dwell in the channel until at least its surface has cooled to below the softening point of the thermoplastic so that it may be handled without disturbing its shape and so that the beads will not continue to expand after exiting the molding channel 10. However, the cooling means described is distinct from the basic invention relating to a molding channel having only a single moving surface. Thus the concept would work even if the slab is not cooled within the molding channel.

In order to facilitate passage of the slab through the molding channel, the non-moving surfaces 28, 32 and 33 may be treated to reduce friction. Such treatments as polishing, chrome plating or applying Teflon or nylon to the surface have been found to be suitable. Transport of the slab through the channel is aided by treating the surface of the belt 18 to increase friction. The apparatus described will produce slabs of more even density and strength and of better dimensional conformity to the shape of the molding channel. This is a result of the more rigid molding channel provided and less opportunity for steam to leak out of the channel. In this respect, convenient means may be provided to seal the sides 30 and 31 against the upper run 16 of the belt.

By the use of only a single moving surface considerable economy of moving parts is accomplished with a resultant decrease in maintainance costs. In addition, it is now possible to adjust the size of the molding channel with ease and even without shutdown.

From the description given above, those skilled in the art will see that the quality of the finished product depends on dynamic variations in belt speed, rate of feed of the beads, temperature and quality of the heating steam and dwell time coupled with cooling. It can be seen that a much more controlled and controllable condition exists in the apparatus here disclosed than in prior art apparatus.

Preferred embodiments of the apparatus, which generally constituted refinement of the foregoing basic concept are illustrated in FIGS. 3–6 and will now be described in detail.

Figure 4:
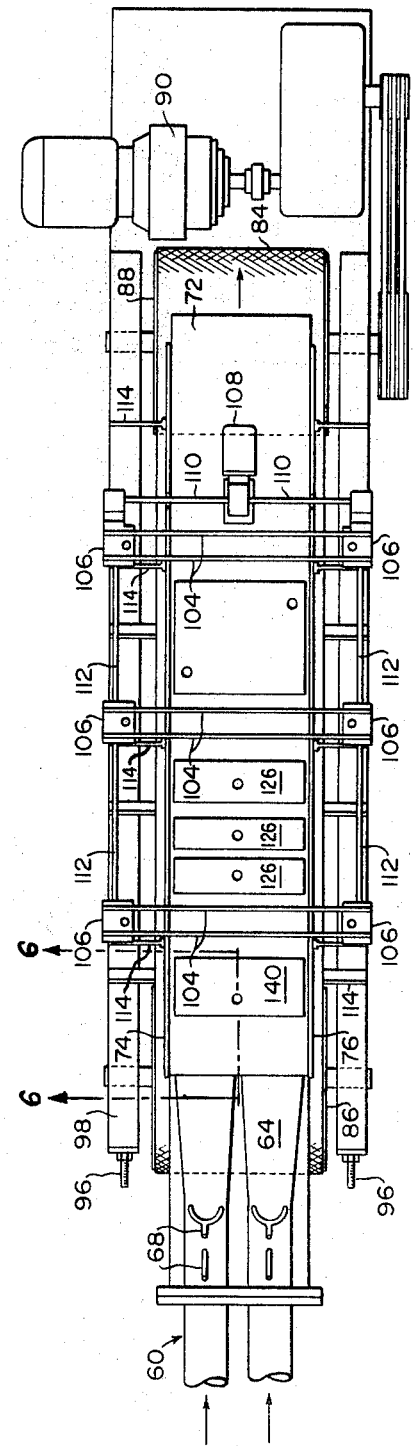
FIG. 4 shows a plan view of the embodiment of FIG. 3.
Figure 3:
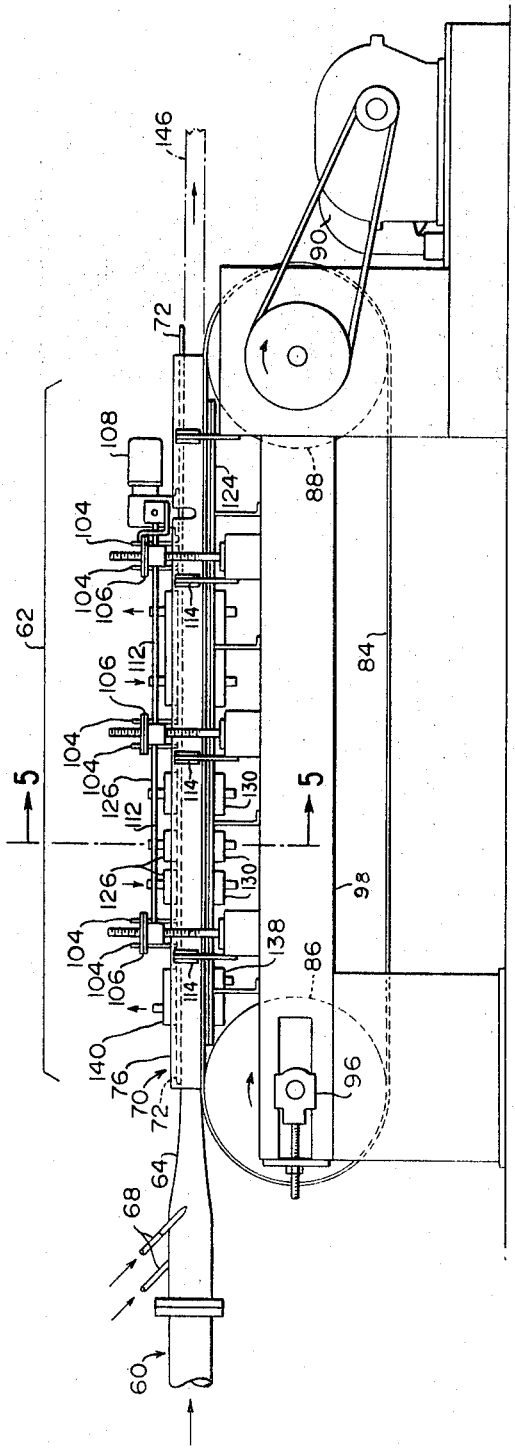
FIG. 3 shows a side elevation view of an alternative preferred embodiment.

Referring to FIGS. 3, 4 and 5, the apparatus consists generally of a feeding means 60 and a linear molding apparatus 62, the latter of which is of primary interest in this invention.

The feeding means 60 illustrated is further described in U.S. Pat. No. 3,402,970 to H. F. Shroyer. For purposes of the instant invention, the feeding means is generally of the nature wherein pre-expanded polystyrene beads are blown into the molding channel in a stream of air. The feeding means generally embodies a feed conduit 64, an inlet conduit 66 and compressed air nozzles 68 whereby a vacuum is created to draw beads from a supply source and blow them into the molding apparatus. Further mention will be made of the cooperative advantages of air loading the beads with the balance of the apparatus in the following description.

A stationary portion of a molding channel 70 is defined by an upper plate 72, a side plate 74 and a side plate 76 presenting molding surfaces in the channel. The lower moving surface is a woven wire belt 84 supported on drums 86 and 88 of which drum 88 is driven by a variable speed drive means generally designated by the numeral 90. The belt 84 is of sufficient roughness to convey the agglutinated slab 82 to discharge at the discharge end 94 of the channel.

The roughness of the belt 84 is in contrast to the smooth stainless steel belts which have been considered necessary in the past to produce an acceptable smooth product. It is significant that in the past it was felt necessary to use moving surfaces on at least both the wider sides in order to avoid rolling of the beads and galling or tearing of the slab. The present invention is in contradistinction to prior practice and theory. Tension on the belt may be adjusted by known means, in this case illustrated by moving the drum 86 along the horizontal axis by means of a take-up bearing 96 secured to the frame 98 .

The upper plate 72 is positioned between the side plates 74 and 76, a tight seal being maintained by the seals 100 and 102 (FIG. 5). An important advantage of this apparatus is the capability to vary the height of the channel and thereby the thickness of the slab over a wide range by moving the upper plate 72 up or down between the side surfaces 74 and 76. Most significantly this can be done without interrupting production by a precise and rapid adjusting means.

This could not be done in the past, in part, because it was necessary that the sides of the molding channel be placed under the upper moving surface in order to maintain the latter flat.

A typical adjusting means comprises a series of gusset plates 104, fixed in pairs as shown to the upper plate 72 and to a series of screw jacks 106 mounted on the frame 98. The screw jacks 106 are driven simultaneously by a reversible gear motor 108 through shafts 110 and 112. The gear motor is secured to the upper plate 72. When it is desired to change the height of the channel the gear motor 108 is operated to raise or lower the screw jacks 106 which in turn raises or lowers the upper plate 72. The side plates 74 and 76 are supported by a plurality of brackets 114 extending from frame 98.

Not only do the stationary side and upper plates 72, 74 and 76 provide a more stable and rigid molding channel but they also provide the feature not previously available, of a tight seal so that steam may not leak at their juncture as is the case with a plurality of moving belts. Such leakage provides a poor bead weld at the corners and in thin slabs results in the entire edge being poorly welded requiring it to be trimmed. As can be seen the apparatus described is essentially closed and as a result all edges and corners of the slabs are uniformly and completely welded.

The corner formed by the juncture of the side plates 74 and 76 and the moving belt 84 nevertheless is susceptible of steam leakage with its attendant disadvantage. This has been eliminated by a unique sealing arrangement shown in FIG. 5. The side plates 74 and 76 have inserts 116 and 118 extending downward to contact the belt, the plates 74 and 76 themselves being spaced somewhat above the belt. The inserts 116 and 118 are replaceable and made of a low friction material such as nylon or Teflon. Below the belt 84 replaceable rub strips 120 and 122, which are also of a low friction material are mounted on a support table 124 which in turn is mounted on the frame 98. The insert 116 is aligned with the rub strip 120 and the insert 118 is aligned with the rub strip 122 to provide a rigid structure so that the inserts 116 and 118 will bear positively on the belt 84. The belt itself is sealed by being impregnated between the rub strips and the inserts with an elastomeric or other compound at 125 so that no leakage may occur.

A plurality of steam chests 126 are arranged above the molding channel to provide steam to the interior of the channel through perforations 125 in the upper plate 67. Any one or combination of the steam chests 126 may be activated. Similar steam chests 130 may be installed below the woven wire belt 84 to inject steam into the molding channel through perforations 128 in the support table 124 (FIG. 5) and through the belt 84. Seals 134 in the sides of the steam chests 126 and 130 act to prevent loss of steam.

There is further provided an evacuation means up-steam chests 126 and 130 adjacent to the molding channel 70 for venting feed air when air feeding apparatus is used and also for extracting steam which flows upstream. The evacuation means for the two functions cited above may be the same means or separate means and may be applied to any of the surfaces of the molding channel 70, singly or in combination. As here embodied and illustrated in FIG. 6 the evacuation means is a vacuum chamber 138 attached below the belt 84 upstream of the steam chests 130 and openly communicating with the interior of the molding channel 70 through the belt 84. A similar vacuum chamber 140 is shown mounted on the upper plate 72 upstream of the steam chests 126 and in communication with the interior of the molding channel 70 through openings provided in the upper plate 72. Vacuum chambers 138 and 140 are attached to a vacuum source. Margin strips 142 and 144 extend transversely across the table 124 and serve to transmit the vacuum potential into the molding channel. Similar strips may also be used adjacent to the steam chests to provide more controlled injection of steam through the molding surface.

In accordance with this invention it has been found to be particularly advantageous that the moving surface be a woven wire belt as described. The woven wire belt is not susceptible to fatigue failure as is a perforated stainless steel belt, and may be installed from commercially available stock without any disassembly of the machine. The woven wire belt is of considerably more openness as a foraminous surface than is possible with perforated belting due to the aforementioned fatigue problems. Further, the woven wire belt is foraminous across its entire width while stainless steel belting could not be perforated close to the edge. In addition, the woven wire belt 84 will not bow under tension as occurs with perforated sheet type belts. Further, woven wire belts present an improved surface of transporting the slab through the molding channel while at the same time not unduly affecting the appearance of the finished product.

By the invention herein described it is also practical to provide side steaming through the sides 74 and 76 in accordance with my U.S. Pat. No. 3,408,690, Apparatus for Making Foamed Polymeric Structures.

In operation the air feeding means 60 is operated at a rate sufficient to fill the molding channel 70 with uncompacted beads upstream of the steam chests 126 and 130. The beads are carried by the woven wire belt 84 into contact with steam from the steam chests 126 and 130 where expansion and formation of a coherent agglutinated slab 146 takes place. It should be appreciated that it is desirable that no voids or interstices be present between the beads after formation of the slab. That is, the beads must expand completely to fill the molding channel. It is also important that the entire surface of each bead be plasticized to assure complete agglutination or welding. It is critical to perform the expansion step rapidly since once it has begun, the expanding beads tend to block passage of steam to the interior of the channel. Thus in the past, especially in the thicker, billet-like slabs, the center was not as well or completely formed as the periphery. Because the stationary upper surface 72 and the woven wire belt 84 may be made more open to the transfer of steam than was possible in the past, the steam may be injected more rapidly over a shorter period of time providing for an improved product with a lesser quantity of steam. By the way of comparison, each of the steam chests of the prior art are roughly equal in size to the three chests 126 shown in FIG. 3.

Coordination of the feeding rate and the molding rate has been a problem in the past because the smooth stainless steel belts utilized would slip on the drive drums as well as the slab product so that the transport rate through the molding channel would vary unpredictably. The woven wire belt 84 shown here eliminates that problem because it is capable of more positive purchase on the drums 86 and 88 and the slab.

As the steam enters the molding channel 70, some fraction tends to flow upstream toward the inlet end 12. The evacuation means as embodied by vacuum chambers 138 and 140 rapidly removes such vagrant heat source before it can effect the bead charge. The absence of such an evacuation means has in the past been a problem because heat flowing upstream acts on the beads in an uncontrolled manner to cause precipitate expansion and agglomeration before the actual molding begins in the molding area. If the steam, as it may, works into the feeding means the apparatus may have to be shutdown to clear agglomerated masses of plastic in the feeding means itself.

Where air feeding is utilized as suggested herein, the evacuation means described also serves to draw feed air out of the molding channel as beads carried into the channel by the air are deposited. Failing to evacuate the feed air causes undesirable turbulence in the molding channel and reverse currents upstream into the feeding means itself. The evacuation means for relief of the feed air need not be vacuum activated but may comprise a passive means such as openings to the apparatus exterior. After formation in the molding area, the coherent slab 146 may be cooled downstreams by a cooling means such as shown in FIGS. 1 and 2. Cooling may also be accomplished by exerting a vacuum on the slab which will withdraw hot air as well as moisture from the slab.

I claim:

1. The method of producing a continuously molded sheet of foamed plastic comprising continuously delivering synthetic thermoplastic granules containing a foaming agent between spaced-apart surfaces of a molding channel, only one of said surfaces being movable to move the granules and the sheet formed therefrom through the molding channel at least one of said surfaces having perforations therein, and passing a heating medium through said perforations to expand and mold the granules passing through said channel into a continuous agglutinated body.

2. The method as defined in claim 1 wherein one molding surface is perforated and the other molding surface is imperforate and the heating medium is passed into the body of granular materials to foam and mold the same into a coherent molded and foamed body.

3. The method of claim 1 wherein the synthetic thermoplastic granules are delivered by blowing them in an air stream into the molding channel at a rate sufficient to fill the molding channel with uncompacted granules upstream of the point of introduction of the heating medium.

4. The method of claim 1 wherein the spaced-apart surfaces of the molding channel are linear.

5. In an apparatus for producing a continuously molded sheet by foaming granules of a synthetic thermoplastic material containing a heat expanding agent into a coherent foamed agglutinated body, said apparatus comprising a linear open-ended molding channel having opposite surfaces spaced apart between which said granules are fed for continuous expansion and molding, said channel comprising only one movable surface which surface is the sole motive source for moving the granules and the agglutinated body formed therefrom through the molding channel at least one of said surfaces being foraminous and means disposed adjacent to said foraminous surface for introducing a heating gas through the perforations of said surface.

6. The apparatus of claim 5 wherein the inner surfaces of the molding channel excepting the moving surface have laminated thereon a layer of a solid low friction material to permit the passage therethrough of foamable synthetic thermoplastic granules and an agglutinated body continuously formed therefrom.

7. The apparatus of claim 5 further comprising a feeding means adjacent to the inlet end of the molding channel adapted to blow polystyrene beads in a stream of air at a rate sufficient to fill the molding channel with uncompacted beads upstream of the means for introducing a heating gas.

8. Apparatus as defined in claim 5 wherein one of said molding surfaces is imperforate and the other surface alone is foraminous.

9. Apparatus as defined in claim 5 wherein both of said molding surfaces are foraminous and the heating medium may pass first through one surface to enter and heat the granules being foamed and molded therein and out through the other surface.

10. In an apparatus for continuously molding granules of synthetic thermoplastic material containing a heat expanding agent of the type wherein the granules are fed into an open-ended molding channel heat expanded by the introduction of a heating fluid therein and discharged as a coherent foamed agglutinated body, the improvement wherein the open-ended molding channel comprises a lower longitudinally movable surface, stationary side surfaces in sealable contact with the lower surface and extending upward therefrom; a stationary upper surface spaced above the lower surface and extending sealably between the side surfaces; means for raising and lowering the top surface between the side surfaces, at least one of said surfaces being foraminous and; means adjacent to said foraminous surface for introducing said heating fluid into the molding channel.

11. The apparatus of claim 10 wherein at least the lower movable surface is foraminous and is a woven wire belt.

12. The apparatus of claim 10 further comprising means adjacent to said molding channel for cooling said body after it has been formed.

13. The apparatus of claim 10 further comprising means for evacuating fluid from the molding channel upstream of the means for introduction of the heating fluid into the molding channel.

14. The apparatus of claim 13 wherein said evacuating means comprises a vacuum chamber adjacent at least one of said surfaces and openly communicating with said molding channel.

15. The apparatus of claim 11 wherein at least the upper surface is also foraminous and further comprising means for evacuating fluid from the molding channel upstream of the means for introduction of heating fluid into the molding channel.

16. The apparatus of claim 11 wherein said heating fluid is steam and said means for introduction thereof is at least one steam chest adjacent to said foraminous surface and the lower woven wire belt is supported by a plurality of members which are affixed to a support table and said table having apertures at the area where steam is to be introduced; said table having additional apertures upstream of the steam chest for evacuating steam from the channel through the wire belt and out through the apertures, the table having margin strips coextensive with the periphery of the steam chest to assure entry of the steam into the channel.

References Cited

UNITED STATES PATENTS

| | | | |
|---|---|---|---|
| 3,335,207 | 8/1967 | Richie | 264—234X |
| 2,648,262 | 8/1953 | Croston et al. | 264—109UX |
| 3,071,805 | 1/1963 | Merkle | 264—123X |
| 3,383,441 | 5/1968 | Norrhede et al. | 264—51 |
| 3,427,372 | 2/1969 | Berner | 264—51 |
| 3,431,595 | 3/1969 | Plum et al. | 18—4(M) |

FOREIGN PATENTS

| | | | |
|---|---|---|---|
| 187,302 | 10/1956 | Austria | 18—4(B) |

PHILIP E. ANDERSON, Primary Examiner

U.S. Cl. X.R.

18—4B, 5P, D16, 60; 264—87, 101, 122, 237, 338, D16, 10

Notice of Adverse Decisions in Interferences

In Interference No. 98,106 involving Patent No. 3,594,461, F. J. Jacob, METHOD AND APPARATUS FOR CONTINUOUSLY MOLDING SHEETS FROM EXPANDABLE POLYMERIC MATERIALS, final judgment adverse to the patentee was renderd Mar. 12, 1973, as to claims 1 and 2.

[*Official Gazette July 10, 1973.*]